(12) United States Patent
Gujarathi et al.

(10) Patent No.: US 9,223,623 B2
(45) Date of Patent: Dec. 29, 2015

(54) DYNAMIC SERVICE RESOURCE CONTROL

(75) Inventors: Nilesh R. Gujarathi, Pune (IN); Suhas A. Kelkar, Pune (IN)

(73) Assignee: BMC SOFTWARE, INC., Houston, TX (US)

( * ) Notice: Subject to any disclaimer, the term of this patent is extended or adjusted under 35 U.S.C. 154(b) by 855 days.

(21) Appl. No.: 13/433,177

(22) Filed: Mar. 28, 2012

(65) Prior Publication Data

US 2013/0262680 A1 Oct. 3, 2013

(51) Int. Cl.
| | |
|---|---|
| *G06F 15/173* | (2006.01) |
| *G06F 15/16* | (2006.01) |
| *G06F 9/50* | (2006.01) |
| *G06F 17/27* | (2006.01) |
| *G06F 17/28* | (2006.01) |
| *G06F 17/30* | (2006.01) |

(52) U.S. Cl.
CPC ............ *G06F 9/5011* (2013.01); *G06F 17/276* (2013.01); *G06F 17/2836* (2013.01); *G06F 17/30* (2013.01); *G06F 17/28* (2013.01); *G06F 17/3053* (2013.01); *G06F 17/30286* (2013.01); *G06F 17/30392* (2013.01); *G06F 17/30864* (2013.01); *G06F 2209/5022* (2013.01)

(58) Field of Classification Search
CPC combination set(s) only.
See application file for complete search history.

(56) References Cited

U.S. PATENT DOCUMENTS

| | | | |
|---|---|---|---|
| 7,570,587 B1* | 8/2009 | Wilson et al. ................. | 370/230 |
| 8,131,855 B2* | 3/2012 | Watanabe et al. ............. | 709/226 |
| 2002/0120744 A1* | 8/2002 | Chellis et al. ................. | 709/226 |
| 2004/0111308 A1* | 6/2004 | Yakov .............................. | 705/8 |
| 2005/0044228 A1* | 2/2005 | Birkestrand et al. .......... | 709/226 |
| 2006/0167703 A1* | 7/2006 | Yakov .............................. | 705/1 |
| 2008/0195388 A1* | 8/2008 | Bower ................... G06F 3/0237 704/243 |
| 2008/0244576 A1* | 10/2008 | Kwon et al. ....................... | 718/1 |
| 2009/0183168 A1* | 7/2009 | Uchida .......................... | 718/104 |
| 2009/0238090 A1* | 9/2009 | Sambhwani et al. .......... | 370/252 |
| 2010/0098013 A1* | 4/2010 | Jorguseski et al. ............ | 370/329 |
| 2010/0175070 A1* | 7/2010 | Baba .............................. | 718/105 |
| 2010/0223047 A1* | 9/2010 | Christ ................. G06F 17/2836 704/4 |
| 2011/0184719 A1* | 7/2011 | Christ ................... G06F 17/276 704/2 |
| 2012/0233613 A1* | 9/2012 | Shimogawa et al. ............. | 718/1 |

OTHER PUBLICATIONS

"AWS Elastic Beanstalk", amazon web services, API Version, API Reference, Dec. 1, 2010, 122 pages.
"AWS Elastic Beanstalk", amazon web services, Developer Guide, API Version, Dec. 1, 2010, 180 pages.
"Cloud Computing and Virtualization 2010—Conference in Singapore", itevent, Retrieved on Feb. 27, 2012, pp. 1-4. Available at: http://itevent.net/cloud-computing-and-virtualization-2010-conference-in-singapore.

(Continued)

*Primary Examiner* — Saket K Daftuar
(74) *Attorney, Agent, or Firm* — Brake Hughes Bellerman LLP

(57) ABSTRACT

The embodiments may provide a data processing apparatus for controlling service resource allocation. The data processing apparatus including a resource hints controller configured to obtain a resource control request before a task is to be executed on a virtual machine having resources allocated to a processing unit, a memory unit and a storage unit. The resource hints controller is configured to obtain a usage of the resources allocated to at least one of the processing unit, the memory unit and the storage unit of the virtual machine, and increase the resources allocated to the at least one of the processing unit, the memory unit and the storage unit in response to the resource control request based on the usage being equal to or above a threshold level.

20 Claims, 10 Drawing Sheets

(56) References Cited

OTHER PUBLICATIONS

"Silverline", Librato Silverline, Improve Cloud Server utiliation with Silverline, Retrieved on Feb. 27, 2012, pp. 1-2. Available at: https://silverline.librato.com/promo/cloud_tools.

"What are Containers?", Application Resource Management / Knowledge Base, librato Support, Retrieved on Feb. 27, 2012, pp. 1-6. Availablet at: http://support.silverline.librato.com/kb/workload-management/what-are-containers.

* cited by examiner

DYNAMIC SERVICE RESOURCE CONTROL

TECHNICAL FIELD

The present disclosure relates generally to dynamic service resource control.

BACKGROUND

Virtualization is used in datacenters for the hosting of business services, which may be realized with multiple applications, because virtualization offers increased server utilization and management capabilities. Typically, a distributed computing network includes a plurality of server and client devices connected via a network in order to provide a business service to customers by using the applications and clients. For example, an Airlines Ticketing System is a business service provided to customers to book tickets, search airlines, and generate reports. Such a business service may be realized by deploying the applications across a number of tiers (e.g., a presentation tier, web-server tier, database tier, reports generation tier). In one example, a first server associated with a second tier may host the web-server application, and a second server in tier below the first server may host the database associated with the web-server application. The first and second servers may be running on virtual machines (VMs). A virtual machine manager (VMM) or hypervisor may divide its physical hardware resources and allocate parts of the hardware resources to the first VM server and the second VM database server, for example. The resources of each VM server may include a number of resources, such as a processor or computer processing unit (CPU), memory or cache, and disk, and possibly other resources. Each VM server may run on a virtual imitation of the hardware layer with a guest operating system and applications executing on the guest operating system as if the VM is operating on real physical resources.

When the customer application is executing one or more resource demanding tasks (e.g., handling a relatively large amount of records) across the VM servers, the system may suffer from spikes or resource starvation situations. When executing a resource demanding task, the usage of the CPU and memory may exceed 100%, which may lead to resource starvation situations and slow down all the tasks in the affected servers, as well as dependent VMs in other tiers and the entire customer business service application. Conventional methods utilize extrinsic monitoring based techniques on the resources to repair resource starvations. However, these extrinsic monitoring based techniques are reactive mechanisms that increase CPU or memory, and do not react in a relatively sufficient amount of time to suppress the sudden spikes. Further, these techniques may repair the resource starvation issue after at least some damage is done to the system. Furthermore, resource starvation situations that occur in one VM server, e.g., the first VM server, may cause prolonged non-responsiveness, cascaded problems with dependent VM servers in other tiers, e.g., the second VM database server and entire customer business service.

SUMMARY

The embodiments provide a data processing apparatus for controlling service resource allocation. The data processing apparatus including at least one processor and a non-transitory computer-readable storage medium including instructions executable by the at least one processor. The instructions configured to implement a resource hints controller configured to obtain a resource control request before a task is to be executed on a virtual machine having resources allocated to a processing unit, a memory unit and a storage unit. The resource hints controller is configured to obtain a usage of the resources allocated to at least one of the processing unit, the memory unit and the storage unit of the virtual machine, and increase the resources allocated to the at least one of the processing unit, the memory unit and the storage unit in response to the resource control request based on the usage being equal to or above a threshold level.

The resource hints controller is configured to obtain the resource control request includes receiving the resource control request, over a network, from the virtual machine before the task is to be executed.

The resource hints controller is configured to obtain the usage of the resources allocated to one of the processing unit, the memory unit and the storage unit includes receiving monitoring information, over a network, from the virtual machine. The monitoring information may provide the usage of the resources allocated to the at least one of the processing unit, the memory unit and the storage unit.

According to one embodiment, the resource hints controller configured to receive a task complete response, over a network, from the virtual machine, where the task complete response indicates that the task has been executed. Also, the resource hints controller is configured to decrease the resources allocated to the at least one of the processing unit, the memory unit and the storage unit in response to the task complete response.

The resource hints controller may be configured to increase resources allocated to a secondary virtual machine that is dependent on the virtual machine, where the secondary virtual machine is in the same or different tier than the virtual machine.

The embodiments provide a system for controlling service resource allocation. The system may include a virtual machine being associated with an operating system and resources allocated to a memory unit, a processing unit and a storage unit. The memory unit is configured to store computer-executable instructions. The processing unit is configured to execute a plurality of tasks of an application being executed on the operating system according to the computer-executable instructions. The computer-executable instructions may include one or more embedded resource control hints. The virtual machine may be configured to obtain an embedded resource control hint from the computer-executable instructions before executing a task of the plurality of tasks, where the resources allocated to at least one of the memory unit, the processing unit and the storage unit are increased based on the embedded resource control hint, and the processing unit is configured to execute the task using the increased resources.

The virtual machine is configured to transmit a resource control request, over a network, to a resource hints controller in response to the embedded resource control hint and the resources allocated to the at least one of the memory unit, the processing unit and the storage unit are increased in response to the resource control request.

The virtual machine is configured to obtain a secondary embedded resource control hint from the computer-executable instructions after the task is executed, and the resources allocated to the at least one of the memory unit, the processing unit and the storage unit are decreased based on the secondary embedded resource control hint.

The virtual machine is configured to transmit a task completion response, over a network, to a resource hints controller after the task is executed, and the resources allocated to the at least one of the memory unit, the processing unit and the storage unit are decreased based on the task completion response.

The system may further include a resource hints controller configured to increase the resources allocated to the at least one of the memory unit, the processing unit and the storage unit including, receiving a resource control request before the task is to be executed in response to the embedded resource control hint, obtaining a usage of the resources allocated to the at least one of the processing unit, the memory unit and the storage unit, and increasing the resources allocated to at least one of the processing unit, the memory unit and the storage unit in response to the resource control request based on the usage being equal to or above a threshold level.

The resource hints controller is configured to increase the resources allocated to a secondary virtual machine in response to the resource control request, where the secondary virtual machine is in the same or different tier than the virtual machine.

The application may be a multi-tier application, and the resource hints controller, the virtual machine, the secondary virtual machine may realize a logical service.

The embodiments provide a method for controlling service resource allocation. The method may include obtaining a resource control request before a task is to be executed on a virtual machine having resources allocated to a processing unit, a memory unit and a storage unit, obtaining a usage of the resources allocated to at least one of the processing unit, the memory unit and the storage unit of the virtual machine, and increasing the resources allocated to the at least one of the processing unit, the memory unit and the storage unit in response to the resource control request based on the usage being equal to or above a threshold level.

The obtaining a resource control request may include receiving the resource control request, over a network, from the virtual machine before the task is to be executed. The obtaining the usage of the resources allocated to the at least one of the processing unit, the memory unit and the storage unit may include receiving monitoring information, over a network, from the virtual machine. The monitoring information may provide the usage of the resources allocated to the at least one of the processing unit, the memory unit and the storage unit.

The method may further include receiving a task complete response, over a network, from the virtual machine, where the task complete response indicates that the task has been executed, and decreasing the resources allocated to the at least one of the processing unit, the memory unit and the storage unit in response to the task complete response.

The method may further include increasing resources allocated to a secondary virtual machine that is dependent on the virtual machine, where the secondary virtual machine is in the same or different tier than the virtual machine.

The embodiments may also include a method for controlling service resource allocation. The method may include obtaining an embedded resource control hint from computer-executable instructions before executing a task of a plurality of tasks associated with an application executing on an operating system of a virtual machine, where the virtual machine has resources allocated to a memory unit, a processing unit and a storage unit. The method may include increasing the resources allocated to at least one of the memory unit, the processing unit and the storage unit based on the embedded resource control hint and executing the task using the increased resources.

The method may include transmitting, over a network, a resource control request to a resource hints controller in response to the embedded resource control hint, and the resources allocated to the at least one of the memory unit, the processing unit and the storage unit are increased in response to the resource control request.

The method may further include obtaining a secondary embedded resource control hint from the computer-executable instructions after the task is executed, and deceasing the resources allocated to the at least one of the memory unit, the processing unit and the storage unit based on the secondary embedded resource control hint.

BRIEF DESCRIPTION OF THE DRAWINGS

FIG. 8(*b*) illustrates a flow chart for increasing resources of one or more servers according to an embodiment; and FIG. 8(*c*) illustrates a flow chart for decreasing resources of one or more servers according to an embodiment.

DESCRIPTION OF EXAMPLE EMBODIMENTS

Figure 1:
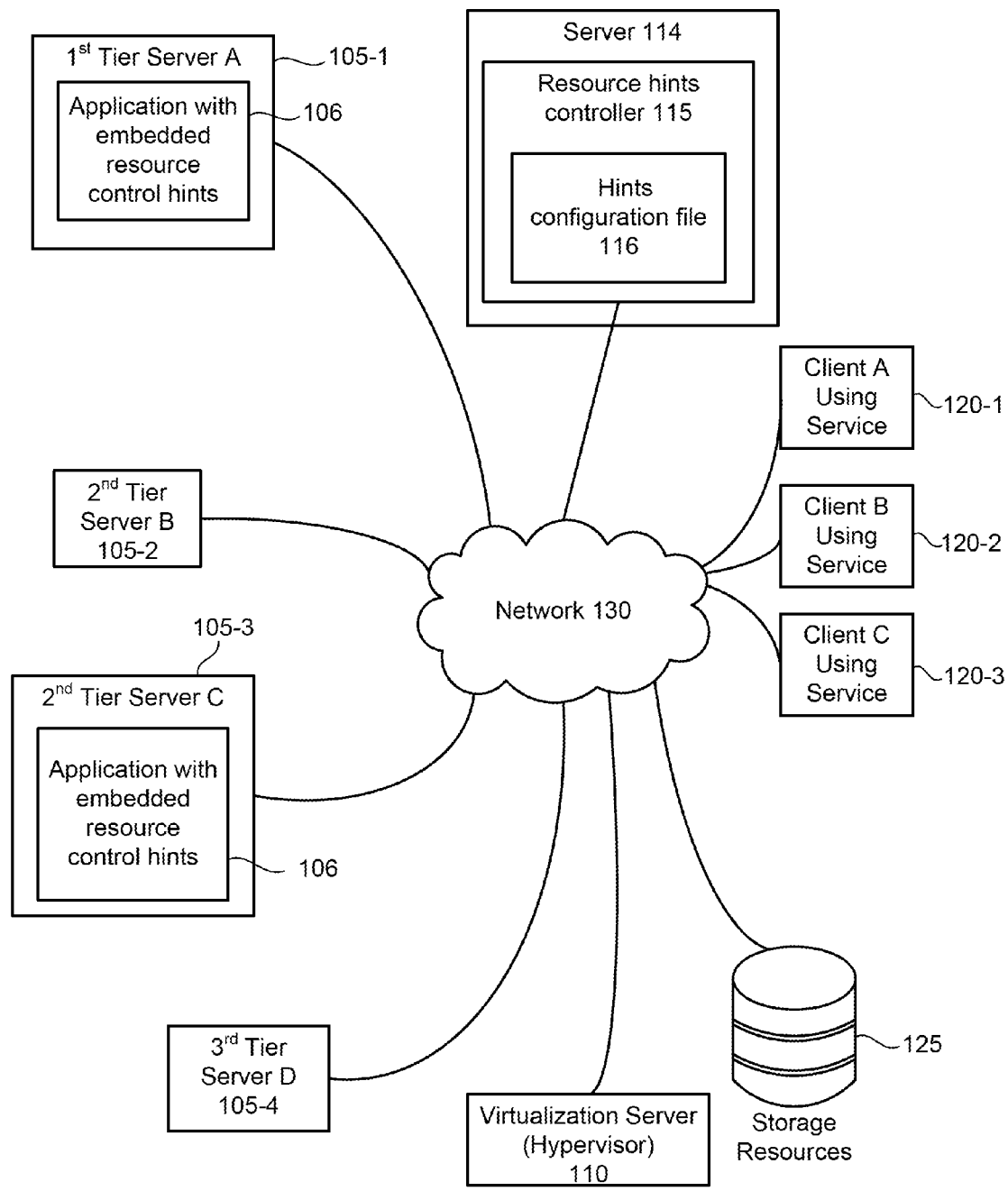
FIG. 1 is a system for implementing a dynamic service resource control mechanism according to an embodiment.

FIG. 1 is a system 100 for implementing a dynamic service resource control mechanism. The system 100 may include a plurality of servers 105 in tiers, and applications 106 operating on the servers 105 at multiple tiers, a virtualization server 110 (e.g., a hypervisor or virtual machine manager), a resource hints controller 115 and corresponding hints configuration file 116 implemented in a server 114, a plurality of client devices 120, and a storage resource database 125. The servers 105, the virtualization server 110, the storage resource database 125, the client devices 120, and the server 114 may be connected to a network 130. Further, the system 100 may include other components that are well known to one of ordinary skill in the art.

The plurality of servers 105 may include a first server 105-1, a second server 105-2, a third server 105-3, and a fourth server 105-4, which are arranged in a plurality of tiers. Although FIG. 1 only depicts four servers, the system 100 may include any number of servers. The first server 105-1 may be associated with a first tier of an application solution provided to the client devices 120. For example, the first server 105-1 may host a web service, and the database services of the web service may be provided by the second server 105-2, which is associated with a second tier of an application solution. In addition, the second tier may also include the third server 105-3. The third tier of an application solution may include the fourth server 105-4. The embodiments encompass any number of tiers and associated servers. In one embodiment, each server 105 may be a virtual machine having allocated hardware resources, as further explained below.

The virtualization server 110 may manage the plurality of servers 105. For example, the virtualization server 110 may include the hypervisor, hardware resources and virtualization operating system software. The virtualization server 110 may create the virtual machines such as the plurality of servers 105, and dynamically allocate the virtualization software and hardware resources of the virtualization server 110 to each server 105. In this context, the virtualization software may include a layer of software installed directly on the allocated hardware resources. As such, each server 105 may be associated with hardware resources such as a processing unit (e.g., 220 in FIG. 2) having one or more processors, a memory unit (e.g., 215 in FIG. 2), a network interface (e.g., 225 in FIG. 2), and a storage unit (e.g., 230 in FIG. 2). Further, each server 105 may include a monitoring unit (e.g., 235 in FIG. 2) that monitors a usage of the resources. These features are further detailed in FIG. 2.

The storage resource database 125 may be any type of network storage. In one embodiment, the storage resources database 125 may be a network-attached storage (NAS), which is a file-level computer data storage connected to the network 130 providing data access to the servers 105 and indirectly to the client devices 120. Similar to the hardware resources of the virtualization server 110, the virtualization server 110 may allocate the storage resources 125 to each of the servers (e.g., storage unit 230 in FIG. 2).

The servers 105, the resource hints controller 115, the client devices 120, the virtualization server (Hypervisor/VMM) 110 and the storage resource database 125 may communicate with each other via the network 130. The network 130 may include a local area network (LAN), a wide area network (WAN), or any other type of network known to one of ordinary skill in the art.

The client devices 120 may include any type of computing device such as a personal computer, laptop, smartphone, or any other type having a processor and memory. The client devices 120 may communicate with each other and with one or more of the servers 105 via the network 130 according to methods that are well known to one of ordinary skill in the art.

As indicated above, the first server 105-1 may include an application 106 such as a web service application operating on a guest operating system (e.g., 210 in FIG. 2) of the first server 105-1. According to an embodiment, the application 106 may include instructions for carrying out tasks or processes associated with the application. The instructions of the application 106 may include embedded resource control hints, which prompt the resources hints controller 115 to determine whether the resources of the server 105-1 or the dependent second server 105-2 should be increased, as further explained below. For example, the instructions may include one or more embedded resources control hints within the application architecture or programming code. According to an embodiment, the embedded resource control hints are inserted into the instructions before tasks or processes that are known to require a significant amount of resources, which may cause spikes or starvations within the first server 105-1, the second server 105-2, or any other server 105 in the system 100. Furthermore, the embedded resource control hints may be inserted into the instructions after the resource demand task is complete. When the first server 205-1 reads the embedded resource control hint after the task is completed, the embedded resource control hint may prompt the resources hints controller 115 to decrease the resources to lower levels or its original state (e.g., before the resources were increased).

The embedded resource control hints may include information that identifies the particular resource demanding task. It should be noted that the task may be associated with a task executed by the first server 105-1 (Server A) or one of the dependent servers such as the second server 105-2 (Server B) associated with the second tier. Before the first server 105-1 executes a particular resource demanding task, the first server 105-1 may read the embedded resource control hint. Upon discovery of the resource control hint, the first server 105-1 may send a resource control request, over the network 130, to the resource hints controller 115. The resource control request may identify the resource demanding task. In one embodiment, the resource control request may include monitoring information that indicates a current usage of the resources such as the processing unit, the memory unit, and the storage unit of the first server 105-1, as well as the current usage of any dependent server such as the second server 105-2. Alternatively, each server 105 may periodically transmit its respective monitoring information, over the network 130, to the resources hints controller 115.

The server 114 may include the resource hints controller 115. The resource hints controller 115 may include a hints configuration file 116 that includes instructions for carrying out the functions of the resource hints controller 115. Further, the resource hints controller 115 may include one or more processes and have a computer readable storage medium that may store the hints configuration file 116. The hints configuration file 116 may be configurable by an administrator, who may adjust the values and conditions, in order to modify the way the resource hints controller 115 scales up/down the resources associated with the affected servers 105 in multiple tiers due to execution of a particular task. As a result, the administrator may have the flexibility to change the hints configuration file 116 at run time when the resource hints controller 115 is deployed and running. In one example, the resource hints controller 115 may receive the resource control request, and determine whether or not to increase the resources of the first server 105-1 as well as the dependent second server 105-2 according to the conditions provided in the hints configuration file 116.

In one embodiment, the resource hints controller 115 may compare the usage of at least one of the processing unit, the memory unit, and the storage unit from the monitoring information to a threshold level. Also, the resource hints controller 115 may function according to any type of condition specified in the hints configuration file 116. If the usage is equal to or above the threshold level, the resource hints controller 115 may determine to increase the resources of at least one of the memory unit, the processing unit and the storage unit of the first server 105-1. The increased amount may be specified in the hints configuration file 116. If the usage is below the threshold level, the resource hints controller 115 may determine not to increase the resources of the processing unit, the memory unit, and the storage unit of the first server 105-1. In addition, the resource hints controller 115 may determine whether to increase the resources of any servers 105 dependent on the first server 105-1 for executing the resource demanding task. For example, the resource hints controller 115 may determine that the resource demanding task also involves the second server 105-2. As such, the resource hints controller 115 may compare the current usage of the processing unit, the memory unit and the storage unit of the second server 105-2, and determine to increase the resources allocated to these components if the current use exceeds a threshold level.

If the resource hints controller 115 determines to increase the resources of one or more of the servers 105, the resource hints controller 115 may notify the virtualization server 110 so that the virtualization server 110 may increase the resources of the one or more servers 105 in the manner specified in the hints configuration file 116.

Thereafter, the first server 105-1 and/or the second server 105-2 execute the resource demanding task using the increased resources. After the first server 105-1 and/or the second server 105-2 execute the resource demanding task using the increased resources, the first server 105-1 may read another embedded control resource hint, which prompts the first server 105-1 to transmit a task completion response to the resource hints controller 115. In response to the task complete response, the resource hints controller 115 may decrease the resources allocated to the processing unit, the memory unit, and/or the storage unit of the first server 105-1 and/or the second server 105-2. The resources may be decreased to a level before the resource demanding task or any other level specified in the hints configuration file 116. As such, the system 100 may proactively adjust the resources of the appropriate servers 105 before the resource hungry tasks cause any damage to the system in terms of spikes and outages.

Figure 2:
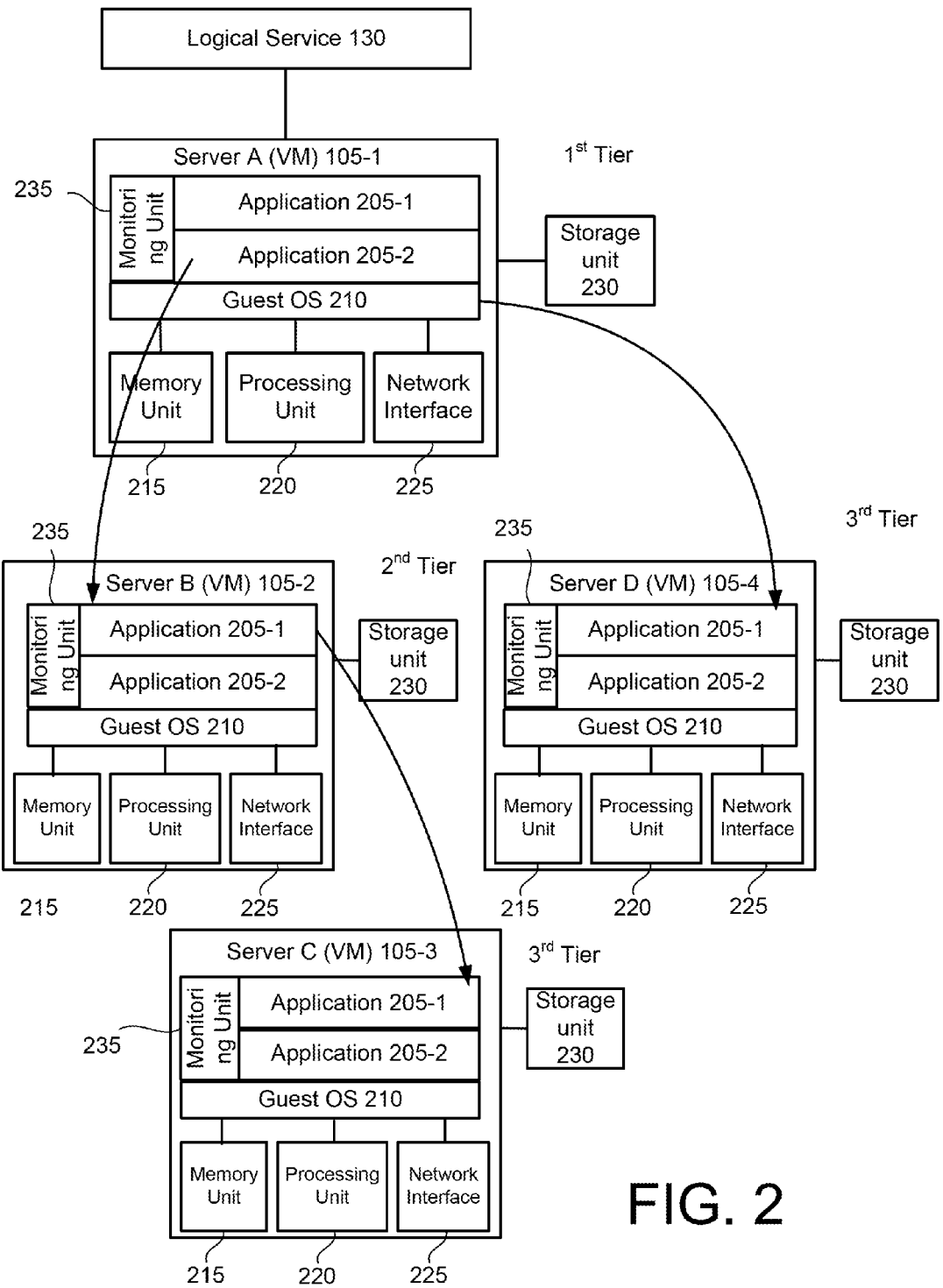
FIG. 2 illustrates a plurality of servers of the system of FIG. 1 according to an embodiment.

Also, referring to FIG. 1, the third server 105-3 associated with the second tier may include an application 106 executing on its guest operating system, which may include embedded resource control hints for tasks relating the third server 105-3 and involving the storage resource database 125, or the individual storage units associated with the servers 105 (e.g., 230 of FIG. 2). For example, the resource hints controller 115 may adjust the resources of the third server 105-3 and the storage resource database 125 in the same manner as described above.

FIG. 2 illustrates an example system depicting the servers 105 in greater detail according to an embodiment. A logical service 130 may be implemented across the plurality of servers 105 such as the first server 105-1, the second server 105-2, the third server 105-3, and the fourth server 105-4. As indicated above, each of the servers 105 may be a virtual machine having allocated resources. Each server 105 may include one or more applications 205, a guest operating system 210, a memory unit 215, a processing unit 220, and a network interface 225. The one or more application 205 may be executed by the guest operating system 210. The applications 205 may be the same as the applications 106 illustrated in FIG. 1. For example, one or more of the applications 205 may include embedded resource control hints. Further, it is understand that each application 205 may be different within its corresponding server 105, and the applications 205 may be different in the various servers 105. In other words, the applications 205 in the different servers 105 may not be the same. Further, as explained in FIG. 4 in more detail, each server 105 may include a monitoring unit 235 that monitors the usage of its respective resources such as the memory unit 215, the processing unit 220, and the storage unit 230.

Further, each server 105 may be associated with a storage unit 230 relating to the storage resource database 125. For example, the virtualization server 110 may allocate to each of the servers 105 network storage space from the storage resource database 125, which is illustrated by the storage unit 230 for each server 105. Also, as shown in FIG. 2, the logical service 130 may be implemented across a series of tiers. For example, the first server 105-1 may have dependent servers such as the second server 105-2 and the fourth server 105-4, which are associated with the second tier. The third tier may include the third server 105-3. However, it is noted that the embodiments may encompass any number of tiers and associated servers 105.

Figure 3:
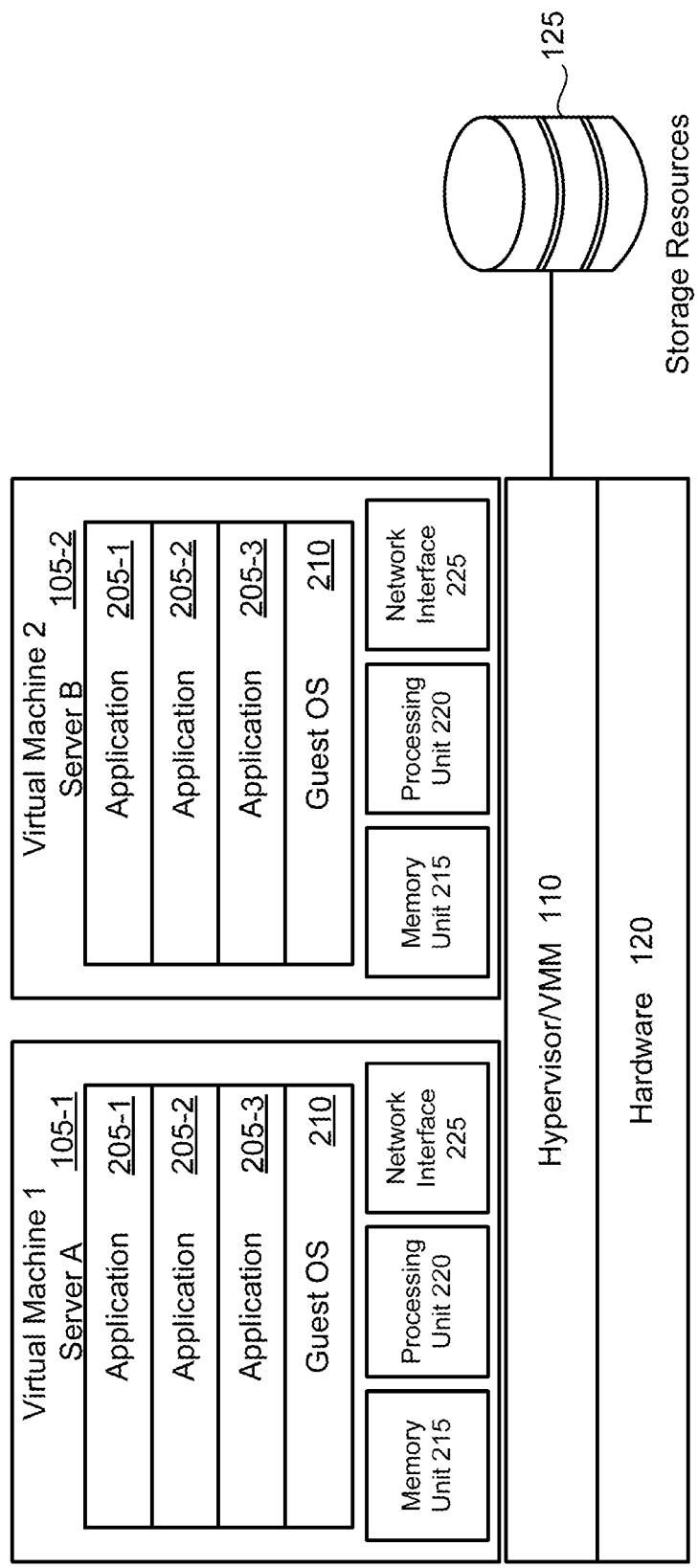
FIG. 3 illustrates a virtualization server having hardware resources according to an embodiment.

FIG. 3 illustrates the virtualization server 110 (Hypervisor or Virtual Machine Manager (VMM)) having hardware resources 120, which are allocated to the servers such as server 105-1 and the server 105-2. For example, the virtualization server 110 may manage the plurality of servers 105. The virtualization server 110 may include the hardware resources 120 and virtualization operating system software. The virtualization server 110 may create and manage the virtual machines as the plurality of servers 105, and dynamically allocate some hardware resources 120 of the virtualization server 110 to each server 105. As such, each server 105 may receive virtual resources from the physical hardware resources 120 such as the processing unit 220 the memory unit 215, the network interface 225, and the storage unit 230.

Figure 4:
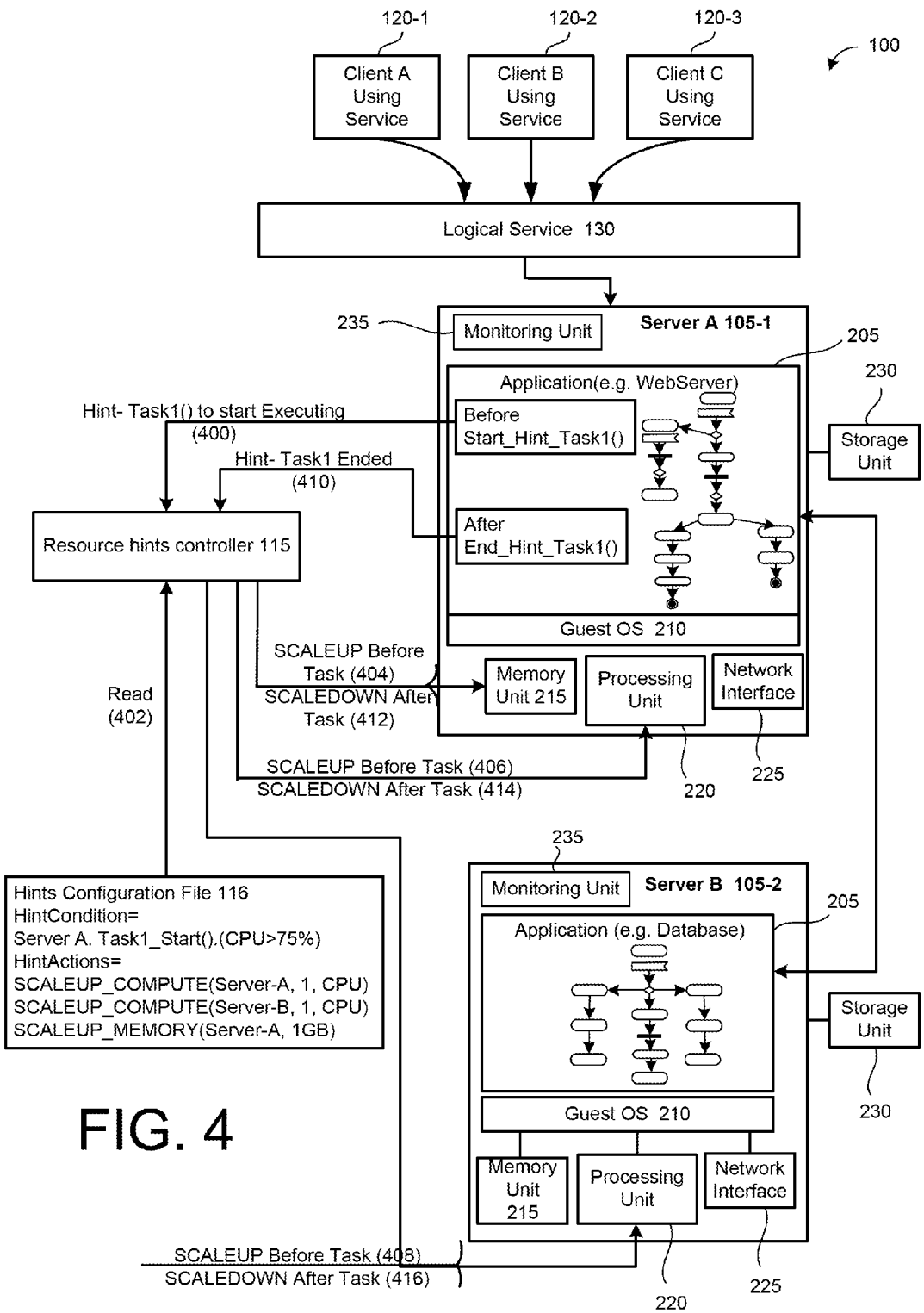
FIG. 4 illustrates the system of FIG. 1 according to another embodiment.

FIG. 4 illustrates the system 100 according to another embodiment. For example, as indicated above, the first server 105-1 may include the application 205 having one or more embedded resource control hints, where the application 205 is running on the guest operating system 210. Further, the first server 105-1 may include the memory unit 215, the processing unit 220, the network interface 225, and the storage unit 230. Further, FIG. 4 illustrates a dependent server such as the server 105-2, which is required to carry out one or more of the tasks associated with the application 205. The second server 105-2 also includes an application 205 running on its own guest operating system 210, as well as its own set of memory unit 215, the processing unit 220, the network interface 225, and the storage unit 230. Further, each of the first server 105-1 and the second server 105-2 includes the monitoring unit 235 as described above.

Before the first server 105-1 executes a particular resource demanding task, the first server 105-1 may read the embedded resource control hint from the application 205. Upon discovery of the resource control hint, referring to communication 400, the first server 105-1 may send a resource control request, over the network 130, to the resource hints controller 115. The resource control request may identify the resource demanding task. In one embodiment, the resource control request may include monitoring information that indicates a current usage of the processing unit 220, the memory unit 215, and the storage unit 230 of the first server 105-1, as well as the current usage of the memory unit 215, the processing unit 220 and the storage unit 230 of any dependent server such as the second server 105-2. Alternatively, the monitoring unit 235 for the first server 105-1 and the second server 105-2 may periodically transmit its respective monitoring information, over the network 130, to the resource hints controller 115.

As shown in FIG. 4, the resource hints controller 115 may include the hints configuration file 116 as explained above. Referring to communication 402, the hints configuration file 116 is read when the resource hints controller 115 starts or when the file has changed. Depending on the contents of the configuration file 116, the resource hints controller 115 may determine whether or not to increase the resources of the first server 105-1 and the second server 105-2.

In one embodiment, the resource hints controller 115 may compare the usage of the processing unit 220, the memory unit 220, and the storage unit 230 for the first server 105-1 and the second server 105-2 to a threshold level. For example, the resource hints controller 115 may compare the usage of the processing unit 220 for the first server 105-1 to a first threshold level, the usage of the memory unit 215 of the first server 105-2 to a second threshold level, the usage of the storage unit 230 to a third threshold, the usage of the processing unit 220 for the second server 105-2 to a fourth threshold level, the usage of the memory unit 215 of the second server 105-2 to a fifth threshold level, and/or the usage of the storage unit 230 of the second server 105-2 to a sixth threshold level. The first through sixth threshold levels may be the same or different. Also, the resource hints controller 115 does not necessarily have to make six independent determinations, where the resource hints controller 115 may automatically increase the resources allocated to the memory unit 215, the processing unit 220 and/or the storage unit 230 for one or more servers 105, if it is determined to increase one of the memory units 215 or one of the processing units 220. If the usage is equal to or above the threshold level, the resource hints controller 115 may determine to increase the resources of one of the memory unit 215, the processing unit 225 and the storage unit 230 of the first server 105-1 and/or the second server 105-2. The increased amount may be specified in the hints configuration file 116. If the usage is below the threshold level, the resource hints controller 115 may determine not to increase the resources of the processing unit 220, the memory unit 215 and/or the storage unit 230 of the first server 105-1 and/or the second server 105-2.

Referring to communication 404, the resource hints controller 115 may increase the resources allocated to the memory unit 215 of the first server 105-1. For example, although not shown in FIG. 4, the resource hints controller 115 may notify the virtualization server 110 to increase the memory unit 215 of the first server 105-1. Referring to communication 406, the resource hints controller 115 may increase the resources allocated to the processing unit 220 of the first server 105-1. For example, although not shown in FIG. 4, the resource hints controller 115 may notify the virtualization server 110 to increase the processing unit 220 of the first server 105-1. Referring to communication 408, the resource hints controller 115 may increase the resources allocated to the processing unit 220 of the second server 105-2. For example, the Resource hints controller 115 may notify the virtualization server 110 to increase the processing unit 220 of the second server 105-2. Also, in this example, as the hints configuration file 116 is configured to increase only the processing unit 220 of server 115-2, the resource hints controller 115 will not increase the memory unit 215 of server 115-2. Which units of which servers 115 are to be increased depends on how the hints configuration file 116 is configured. The resource hints controller 115 may always controls the memory unit 215, the processing unit 220, or storage unit 225 by invoking Virtualization Server 110. Further, the resource hints controller 115 may increase the storage units 230 associated with the servers 105 in the same manner specified above.

Thereafter, the first server 105-1 and/or the second server 105-2 execute the resource demanding task using the increased resources. Referring to communication 410, after the first server 105-1 and/or the second server 105-2 execute the resource demanding task using the increased resources, the first server 105-1 may read another embedded control resource hint, which prompts the first server 105-1 to transmit a task complete response to the resource hints controller 115. The resource hints controller 115 already has the information of the hints configuration file 116 as the resource control processor has already read the hints configuration file 116. As such, in response to the task complete response, the resource hints controller, per the instructions in hints configuration file 116, may decrease the resources allocated to the processing unit, the memory unit, and/or the storage unit 230 of the first server 105-1 and/or the second server 105-2. For example, referring to communication 410, the resource hints controller 115 may decrease the memory unit 215 by notifying the virtualization server 110 through any suitable application programming interface (API). Also, the resource hints controller 115 may decrease (414) the resources of the processing unit 220 of the first server 105-1, and decrease (416) the resources of the processing unit 220 of the second server 105-2. In one embodiment, because the resource hints controller 115 did not increase the memory unit 215 of server 105-2, the resource hints controller 115 may not decrease the memory unit 215 of server 105-2. As such, the system 100 may proactively adjust the resources of the appropriate servers 105 before the resource hungry tasks cause any damage to the system in terms of spikes and outages.

Figure 5:
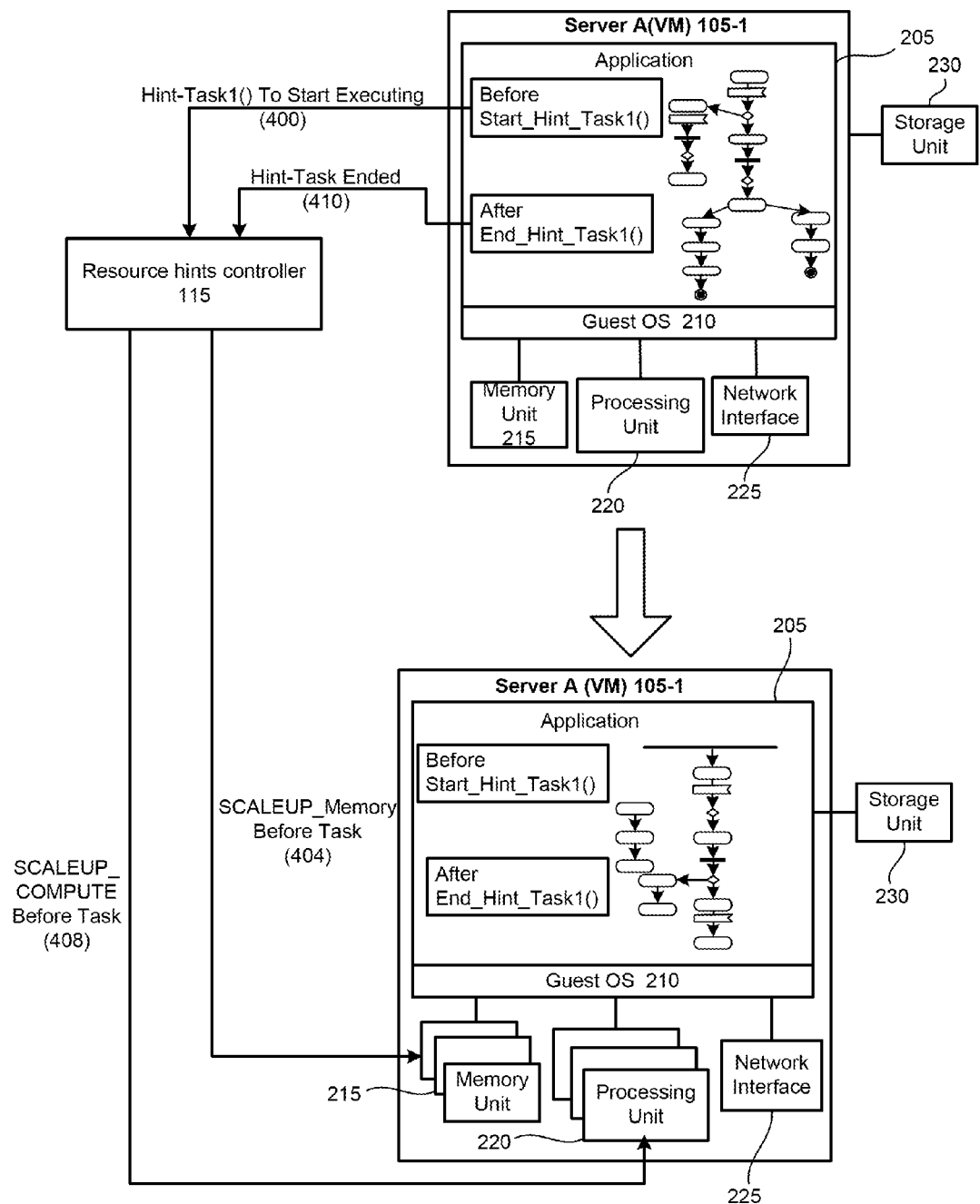
FIG. 5 illustrates a server having the increased resources according to an embodiment.

FIG. 5 illustrates the servers 105 having the increased resources according to an embodiment. For example, FIG. 5 illustrates a state of the first server 105-1 before the resource demanding task is executed and a state of the first server 105-1 having its resources increased such that the first server 105-1 carries out the resource demanding task with the increased resources.

For example, as explained above, the first server 105-1 may read an embedded resource control hint, and transmit a resource control request to the resource hints controller (400). In response to the resource control request, as shown in FIG. 5, the resource hints controller 115 may increase the memory unit (404) and the processing unit (220).

Figure 6:
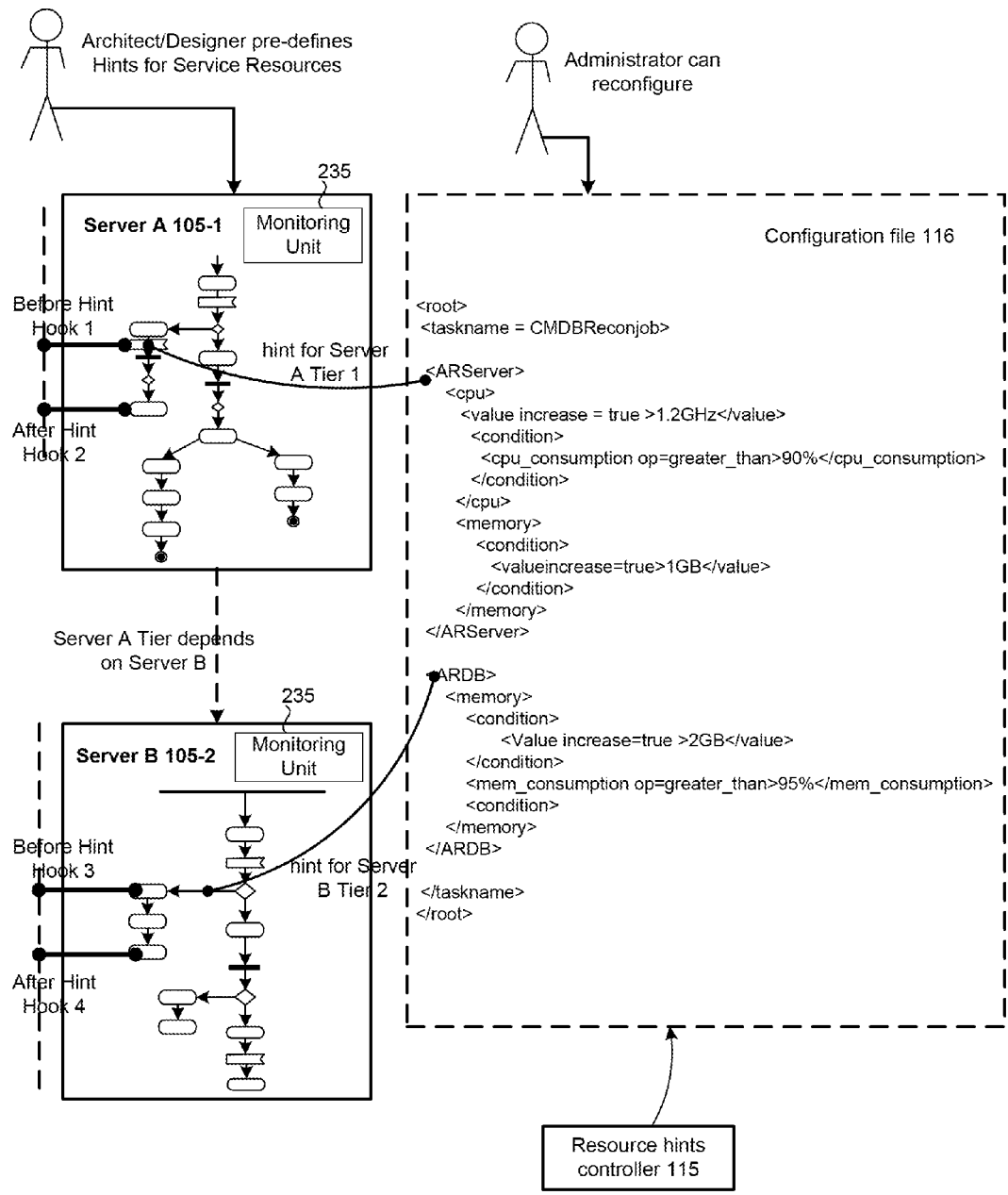
FIG. 6 illustrates an example implementation of the embedded resource control hints according to an embodiment.

FIG. 6 illustrates an example implementation of the embedded resource control hints according to an embodiment. In the example of FIG. 6, embedded resource control hints are implemented in an externalized XML configuration. For example, the embedded control hints are inserted into the programming logic associated with each application operating on the first server 105-1 and the second server 105-2. As such, the designer of the source code for the application may insert the embedded resource control hints within the code itself before tasks that need significantly more resources and also provide default values in the hints configuration file 116. The administrator of the multi-tier virtualized system 100 with the plurality of servers 105 and the logical service 130 as shown in FIG. 4 can configure (or reconfigure) the details of the hints configuration file 116. For example, the configuration or reconfiguration relate to how the service resources are adjusted at the run time of the logical service 130. In one example, the administrator of the logical service 130 and virtualized system 115 may adjust the code of the configuration file 116 of the resource hints controller 115 in order to account for any changes to the system 100.

Figure 7:
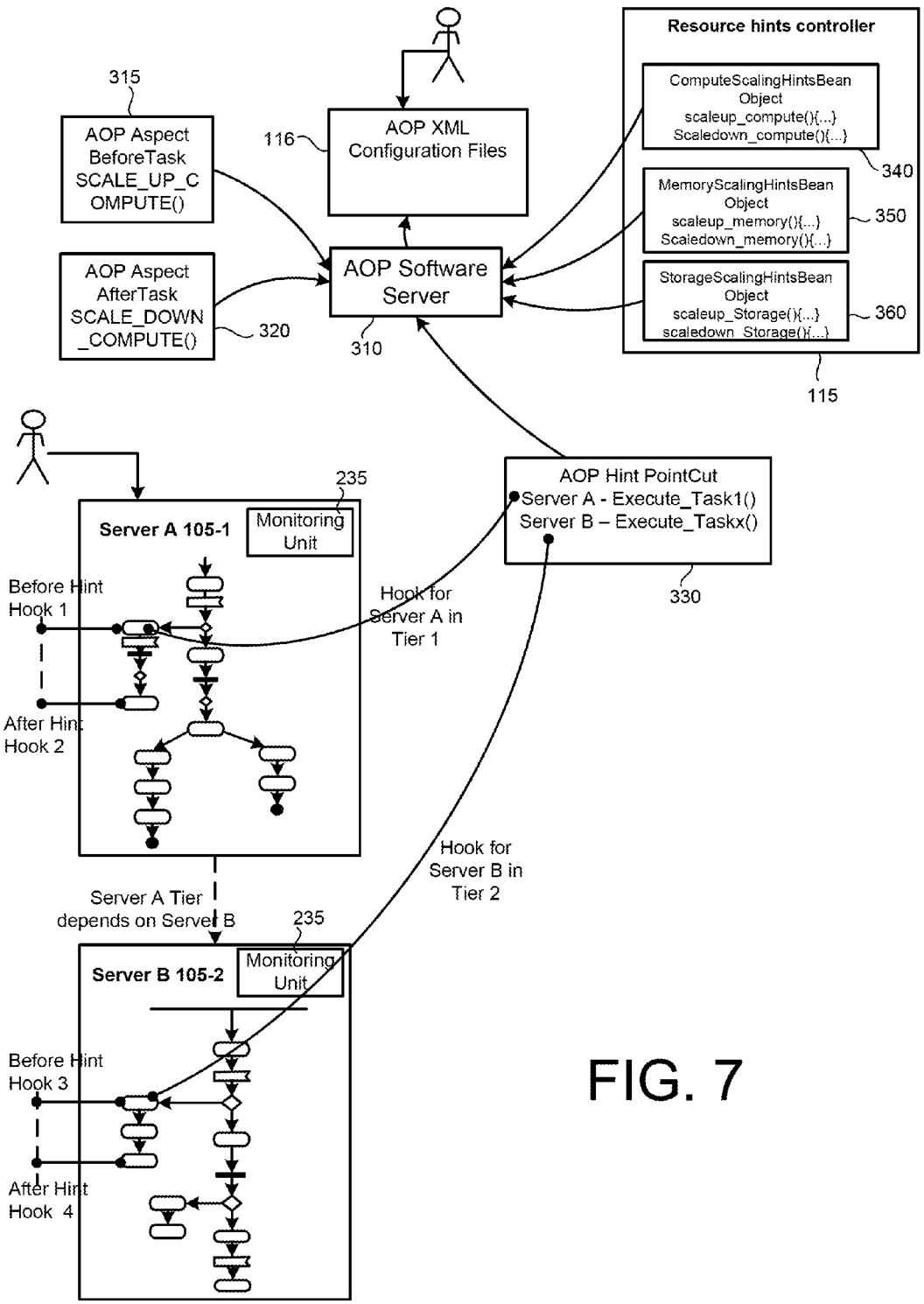
FIG. 7 illustrates an example implementation of the embedded resource control hints according to another embodiment.

FIG. 7 illustrates an example implementation of the embedded resource control hints according to an embodiment. In the example of FIG. 7, the embedded resource control hints are implemented in an AOP implementation configuration. For example, the application 205 executing on the guest operating system 210 of the first server 105-1 and the second server 105-2, as well as the configuration file 116 of the resource controlling hints processor component 115 may be implemented in an AOP implementation configuration. In this case, one or more applications 205 executing in the guest OS 210 of the servers 105 may be considered to be configured with and running with an AOP implementation server 310. The AOP implementation server 310 includes the application source code and the configuration file 116 in a plurality of AOP objects such as objects 315, 320, 330, 340, 350, and 360. The AOP Aspect of beforetask object 315 refers to the function of increasing the resources, the AOP Aspect aftertask object 320 refers to the function of decreasing the resources, the AOP point cuts configuration object 330 refer to the cut-in hook points across the applications code 205, where start and end of tasks require resources adjustments. By inserting the AOP beforetask Aspect object 315 and the AOP aftertask object 320 at the point cuts, it enables calls to the resource hints controller 115. The AOP Bean objects 340, 350 and 360 refer to the objects of the resource hints controller 115, which perform the functions of the resource adjustment for memory units 215, the processing units 220 and/or storage units 225. By arranging the AOP objects in a specified manner, the administrator can control when resources are scaled up and when resources are scaled down without modifying the existing or new source code of the underlying application 205 in enterprise multi-tier application 205 in servers 115. Hence, implementation of embedded resource hints with AOP technique has an advantage of being non-intrusive to the source code of the application 205 and need not be cluttered within its original business logic.

Figure 8A:
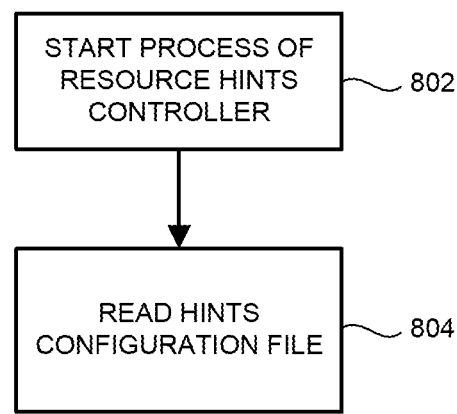
FIG. 8(*a*) illustrates a process executed by a resource hints controller according to an embodiment.
Figure 8B:
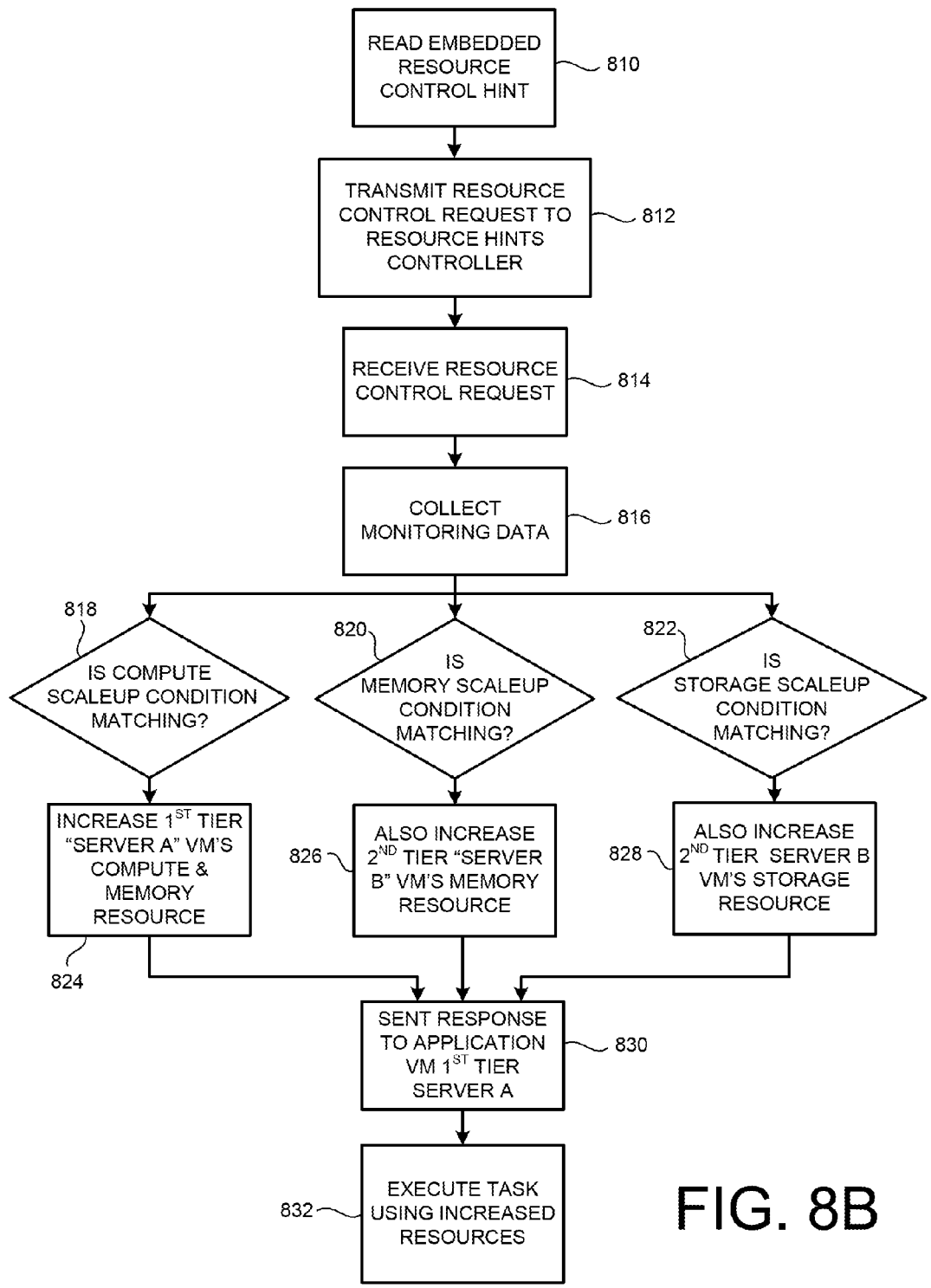
Figure 8C:
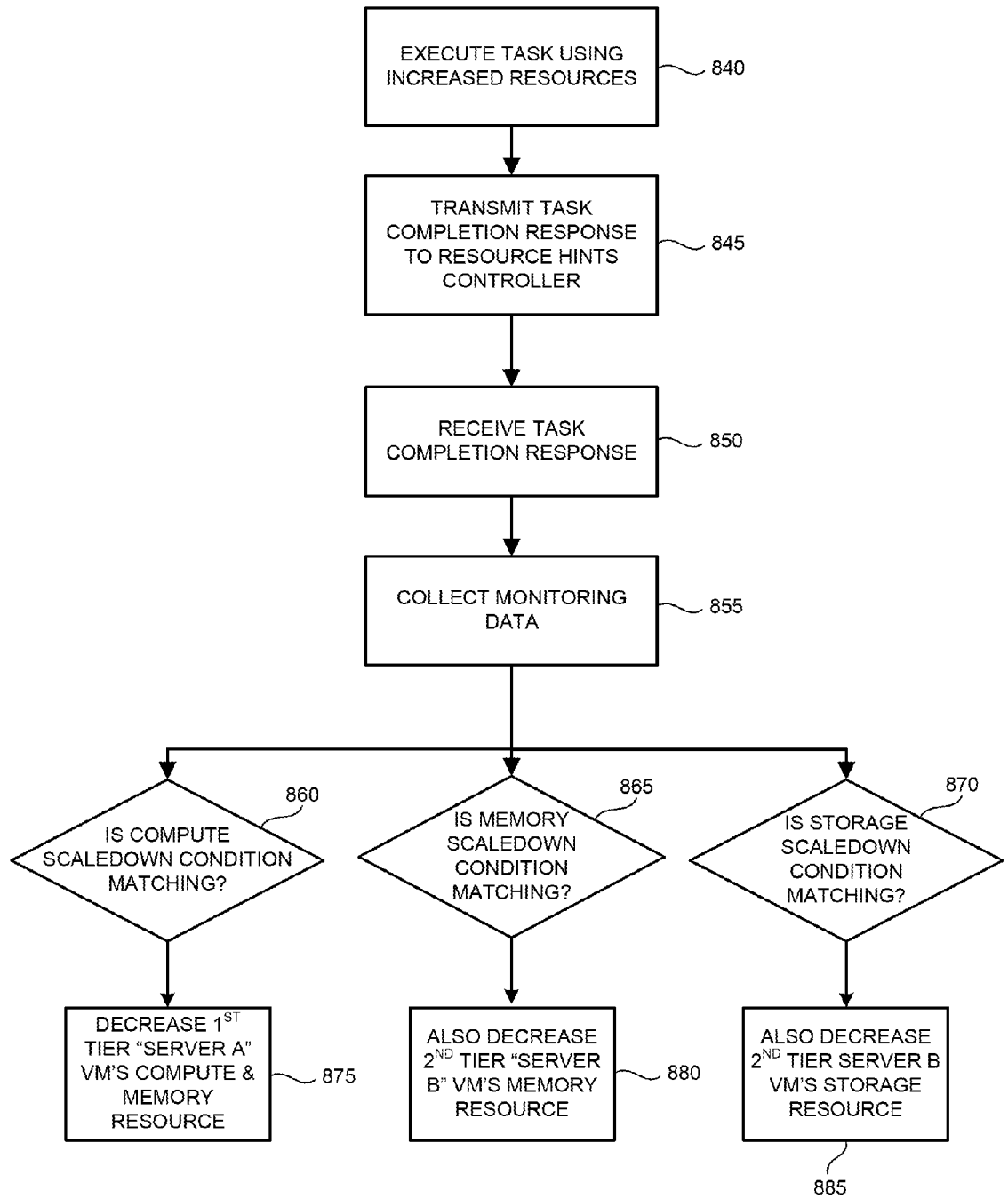

FIG. 8(*a*) illustrates a process executed by the resource hints controller 115 according to an embodiment. Although FIG. 8(*a*) is illustrated as a sequential, ordered listing of operations, it will be appreciated that some or all of the operations may occur in a different order, or in parallel, or iteratively, or may overlap in time.

A process of a resource hints controller may be started (802). For example, the resource hints controller 115 may be already started when the VMs in the application are started.

A hints configuration file may be read (804). For example, after the resource hints controller 115 starts, the resource hints controller 115 may read the hints configuration file 116. The hints configuration file 116 may include instructions for the conditions of scaling up/scaling down the resources of the servers 105. The details of the functions performed by the resource hints controller 115 according to the instructions of the hints configuration file 116 are further explained with reference to FIGS. 8(*b*) and 8(*c*).

FIG. 8(*b*) illustrates a flow chart for increasing resources of one or more servers 105 according to an embodiment. Although FIG. 8(*b*) is illustrated as a sequential, ordered listing of operations, it will be appreciated that some or all of the operations may occur in a different order, or in parallel, or iteratively, or may overlap in time.

An embedded resource control hint may be read (810). For example, the first server 105-1 may read an embedded resource control hint before a task is to be executed. The task may be a resource demanding task that requires additional resources.

A resource control request may be transmitted to a resource hints controller in response to the embedded resource control hint (812). For example, the first server 105-1 may transmit the resource control request to the resource hints controller 115, over the network 130, in response to the embedded resource control hint. The resource control request may identify the particular resource demanding task.

A resource control request may be received (814). For example, the resource hints controller 115 may receive the resource control request, over the network 130, from the first server 105-1. Subsequently, the resource hints controller 115 may perform one or more determinations related to increasing the resources allocated to the first server 105-1 and/or any dependent server 105, as further explained below.

Monitoring information may be collected (816). For example, the resource hints controller 115 may receive monitoring information from the first server 105-1 and/or any dependent servers 105. The monitoring information may include a usage of at least one of the processing unit 220, the memory unit 215, and the storage unit 230. The monitoring information may be received periodically, or alternatively, the monitoring information may be received with the resource control request. The resource hints controller 115 may utilize the monitoring information in order to determine whether to increase the resources of the first server 105-1 and/or any dependent server 105, as further explained below.

A compute scale up condition is determined as being met (818). For example, the resource hints controller 115 may determine whether a compute scale up condition is met. The compute scale up condition may include determining whether a current usage of the processing unit 220 is above a threshold level. However, the compute scale up condition may include any type of condition for scaling up resources.

If the compute scale up condition is determined as being met, resources allocated to a processing unit and/or memory unit of a first server may be increased (824). For example, the resource hints controller 115 may increase the resources allocated to the processing unit 220 and/or the memory unit 215 of the first server 105-1.

A memory scale up condition is determined as being met (820). For example, the resource hints controller 115 may determine whether a memory scale up condition is met. The memory scale up condition may include determining whether a current usage of the memory unit 215 is above a threshold level. However, the memory scale up condition may include any type of condition for scaling up resources.

If the memory scale up condition on a dependent server is determined as being met, resources allocated to a memory unit of a dependent server 105 (e.g., Server B) may be increased (826). For example, the resource hints controller 115 may increase the resources allocated to the memory unit 215 of the second server 105-2.

A storage scale up condition is determined as being met (822). For example, the resource hints controller 115 may determine whether a storage scale up condition is met. The storage scale up condition may include determining whether a current usage of the storage unit 230 is above a threshold level. However, the storage scale up condition may include any type of condition for scaling up resources.

If the storage scale up condition on a dependent server is determined as being met, resources allocated to a storage unit 230 of a dependent server 105 (e.g., Server B) may be increased (828). For example, the resource hints controller 115 may increase the resources allocated to the storage unit 230 of the second server 105-2.

After the resources are increased, a response may be transmitted to a first server (830). For example, the resource hints controller 115 may transmit a response to the first server 105-1 indicating that the increased resource allocation is completed.

A task may be executed using the increased resources (832). For example, the first server 105-1 as well as any dependent servers 105 may execute the task using the increased resources.

FIG. 8(*c*) illustrates a flow chart for decreasing resources of one or more servers 105 according to an embodiment. Although FIG. 8(*c*) is illustrated as a sequential, ordered listing of operations, it will be appreciated that some or all of the operations may occur in a different order, or in parallel, or iteratively, or may overlap in time.

A first server and/or any dependent servers may have finished executing the resource demanding task using the increased resources (840). For example, the first server 105-1 and/or any dependent servers 105 may have finished executing the resource demanding task using the increased resources.

A task completion response may be transmitted to a resource hints controller in response to the completion of the resource demanding task (845). For example, the first server 105-1 may transmit the task completion response to the resource hints controller 115, over the network 130, in response to completion of the resource demanding task.

A task completion response may be received (850). For example, the resource hints controller 115 may receive the task completion response, over the network 130, from the first server 105-1. Subsequently, the resource hints controller 115 may perform one or more determinations related to decreasing the resources allocated to the first server 105-1 and/or any dependent server 105, as further explained below.

Monitoring information may be collected (855). For example, the resource hints controller 115 may receive monitoring information from the first server 105-1 and/or any dependent servers 105. The monitoring information may include a usage of at least one of the processing unit 220, the memory unit 215, and the storage unit 230 for the first server 105 and/or any dependent servers 105. The monitoring information may be transmitted periodically, or alternatively, the monitoring information may be included in the task completion response. The resource hints controller 115 may utilize the monitoring information in order to determine whether to decrease the resources of the first server 105-1 and/or any dependent server 105. Also, the embodiments encompass the situation where the resource hints controller 115 does not utilize monitoring information for decreasing the resources of the first server 105 and/or any dependent servers 105. For example, the resource hints controller 115 may automatically decrease the resources of the first server 105-1 and/or any dependent servers 105 in a manner specified in the hints configuration file 116.

A compute scale down condition is determined as being met (860). For example, the resource hints controller 115 may determine whether a compute scale down condition is met. The compute scale down condition may include determining whether a current usage of the processing unit 220 and/or memory unit 215 is below a threshold level. However, the compute scale down condition may include any type of condition for scaling down resources.

If the compute scale down condition is determined as being met, resources allocated to a processing unit and/or memory unit of a first server may be decreased (875). For example, the resource hints controller 115 may decrease the resources allocated to the processing unit 220 and/or the memory unit 215 of the first server 105-1.

A memory scale down condition is determined as being met (865). For example, the resource hints controller 115 may determine whether a memory scale down condition is met. The memory scale down condition may include determining whether a current usage of the memory unit 215 is below a threshold level. However, the memory scale down condition may include any type of condition for scaling down resources.

If the memory scale down condition on a dependent server is determined as being met, resources allocated to a memory unit 215 of a dependent server 105 (e.g., Server B) may be decreased (880). For example, the resource hints controller 115 may decrease the resources allocated to the memory unit 215 of the second server 105-2.

A storage scale down condition is determined as being met (870). For example, the resource hints controller 115 may determine whether a storage scale down condition on a dependent server is met. The storage scale down condition may include determining whether a current usage of the storage unit 230 is below a threshold level. However, the storage scale down condition may include any type of condition for scaling down resources.

If the storage scale down condition is determined as being met, resources allocated to a storage unit 230 of a dependent server 105 (e.g., Server B) may be decreased (885). For example, the resource hints controller 115 may decrease the resources allocated to the storage unit 230 of the second server 105-2.

The system 100 implementing such features may proactively increase processing units, memory units and storage units of virtual machines before a particular resource demanding task is executed. As a result, the system 100 may avoid spikes because the resources are dynamically allocated, which makes the entire application stack more scalable in dealing with dependent server requirements. Further, the various features of the present disclosure enables developers, architects and also administrators to control the scaling up/scaling down of resources in a controlled, non-invasive manner, and hence makes the logical service 130 proactively scale up/scale down.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. A system for controlling service resource allocation, the system comprising:
    an application including source code for performing a plurality of tasks by at least one processor, the application including a resource control hint embedded into the source code of the application, the plurality of tasks including a resource-intensive task, the resource control hint being positioned within the source code of the application before the resource-intensive task, wherein, while executing the source code of the application, a resource control request is generated upon discovery of the embedded resource control hint;
    a resource hints controller executed by the at least one processor to obtain the resource control request before executing the resource-intensive task on a virtual machine having resources allocated to a processing unit, a memory unit and a storage unit,
    the resource hints controller executed by the at least one processor to determine whether or not to increase the resources allocated to the processing unit, the memory unit, and the storage unit in response to the resource control request,
    wherein the resource hints controller executed by the at least one processor to obtain a usage of the resources allocated to at least one of the processing unit, the memory unit and the storage unit of the virtual machine, and determine to increase the resources allocated to at least one of the processing unit, the memory unit and the storage unit based on the usage being equal to or above a threshold level.

2. The system of claim 1, wherein the resource hints controller executed by the at least one processor to obtain the resource control request includes: receiving the resource control request, over a network, from the virtual machine before the resource-intensive task is executed.

3. The system of claim 1, wherein the resource hints controller executed by the at least one processor to receive monitoring information, over a network, from the virtual machine, the monitoring information providing the usage of the resources allocated to the at least one of the processing unit, the memory unit and the storage unit.

4. The system of claim 1, wherein the resource hints controller executed by the at least one processor to receive a task complete response, over a network, from the virtual machine, the task complete response indicating that the resource-intensive task has been executed, the resource hints controller executed by the at least one processor to decrease the resources allocated to the at least one of the processing unit, the memory unit and the storage unit in response to the task complete response.

5. The system of claim 1, further comprising: the resource hints controller executed by the at least one processor to increase resources allocated to a secondary virtual machine that is dependent on the virtual machine, the secondary virtual machine being in a same or different tier than the virtual machine.

6. A system for controlling service resource allocation, the system comprising:
    a virtual machine being associated with an operating system and resources allocated to a memory unit, a processing unit and a storage unit, the memory unit storing source code of an application, the processing unit executed by at least one processor to execute a plurality of tasks of the application on the operating system according to the source code of the application, the application executed by the at least one processor including a resource control hint embedded into the source code of the application, the plurality of tasks including a resource-intensive task, the resource control hint being positioned within the source code of the application before the resource-intensive task,
    the virtual machine executing the at least one processor to discover the embedded resource control hint from the source code of the application before executing the resource-intensive task, the virtual machine executing the at least one processor to transmit a resource control hint upon discovery of the embedded resource control hint; and
    a resource hints controller executed by the at least one processor to determine whether or not to increase the resources allocated to the processing unit, the memory unit, and the storage unit in response to the resource control request,
    the resource hints controller executed by the at least one processor to increase the resources allocated to at least one of the at least one of the processing unit, the memory unit and the storage unit based on a usage being equal to or above a threshold level.

7. The system of claim 6, wherein the virtual machine executing the at least one processor to transmit the resource control request, over a network, to the resource hints controller.

8. The system of claim 6, wherein the virtual machine executing the at least one processor to obtain a secondary embedded resource control hint from the source code after the resource-intensive task is executed, and the resources allocated to the at least one of the memory unit, the processing unit and the storage unit are decreased in response to discovery of the secondary embedded resource control hint.

9. The system of claim 6, wherein the virtual machine executing the at least one processor to transmit a task completion response, over a network, to the resource hints controller after the resource-intensive task is executed, and the resources allocated to the at least one of the memory unit, the processing unit and the storage unit are decreased in response to the task completion response.

10. The system of claim 6, wherein the resource hints controller executed by the at least one processor to obtain the usage of the resources allocated to the at least one of the processing unit, the memory unit and the storage unit based on monitoring information received over a network, and increase, the resources allocated to at least one of the processing unit, the memory unit and the storage unit in response to the resource control request based on the usage being equal to or above the threshold level.

11. The system of claim 6, wherein the resource hints controller executed by the at least one processor to increase the resources allocated to a secondary virtual machine in response to the resource control request, the secondary virtual machine being in a same or different tier than the virtual machine.

12. The system of claim 6, wherein the application is a multi-tier application, and the resource hints controller, the virtual machine, the secondary virtual machine realize a logical service.

13. A method for controlling service resource allocation, method comprising: obtaining a resource control request before a resource-intensive task of an application is executed by at least one processor on a virtual machine having resources allocated to a processing unit, a memory unit and a storage unit, the application including source code for performing a plurality of tasks executed by the at least one processor, the application executed by at least one processor including a resource control hint embedded into the source code of the application, the plurality of tasks including the resource-intensive task, the resource control hint being positioned within the source code of the application before the resource-intensive task, wherein, while executing the source code of the application, the resource control request is generated upon discovery of the resource control hint;
  determining, by the at least one processor, whether or not to increase the resources allocated to the processing unit, the memory unit, and the storage unit in response to the resource control request including,
  obtaining, by the at least one processor, a usage of the resources allocated to at least one of the processing unit, the memory unit and the storage unit of the virtual machine; and
  increasing, by the at least one processor, the resources allocated to the at least one of the processing unit, the memory unit and the storage unit based on the usage being equal to or above a threshold level.

14. The method of claim 13, wherein the obtaining, by the at least one processor, the resource control request includes: receiving the resource control request, over a network, from the virtual machine before the resource-intensive task is executed.

15. The method of claim 13, wherein the obtaining, by the at least one processor, the usage of the resources allocated to the at least one of the processing unit, the memory unit and the storage unit includes: receiving monitoring information, over a network, from the virtual machine, the monitoring information providing the usage of the resources allocated to the at least one of the processing unit, the memory unit and the storage unit.

16. The method of claim 13, further comprising:
  receiving a task complete response, over a network, from the virtual machine, the task complete response, executed by the at least one processor, indicating that the resource-intensive task has been executed; and
  decreasing, by the at least one processor, the resources allocated to the at least one of the processing unit, the memory unit and the storage unit in response to the task complete response.

17. The method of claim 13, further comprising: increasing, by the at least one processor, resources allocated to a secondary virtual machine that is dependent on the virtual machine, the secondary virtual machine being in a same or different tier than the virtual machine.

18. A non-transitory computer-readable medium storing executable instructions, wherein the instructions executed by at least one processor are configured to:
  obtain a resource control request before a resource-intensive task of an application is executed by the at least one processor on a virtual machine having resources allocated to a processing unit, a memory unit and a storage unit, the application including source code for performing a plurality of tasks, the application including a resource control hint embedded into the source code of the application, the plurality of tasks including the resource-intensive task, the resource control hint being positioned within the source code of the application before the resource-intensive task, wherein, while executing the source code of the application, the resource control request is generated upon discovery of the resource control hint;
  determine whether or not to increase the resources allocated to the processing unit, the memory unit, and the storage unit in response to the resource control request including,
  obtain a usage of the resources allocated to at least one of the processing unit, the memory unit and the storage unit of the virtual machine; and
  increase the resources allocated to the at least one of the processing unit, the memory unit and the storage unit based on the usage being equal to or above a threshold level.

19. The non-transitory computer-readable medium of claim 18, wherein the executable code includes instructions to:
  transmit, over a network, the resource control request to the resource hints controller upon discovery of the embedded resource control hint, and the resources allocated to the at least one of the memory unit, the processing unit and the storage unit are increased in response to the resource control request.

20. The non-transitory computer-readable medium of claim 19, wherein the executable code includes instructions to: obtain a secondary embedded resource control hint from the source code after the resource-intensive task is executed; decrease the resources allocated to the at least one of the memory unit, the processing unit and the storage unit based on the secondary embedded resource control hint.

* * * * *

UNITED STATES PATENT AND TRADEMARK OFFICE
CERTIFICATE OF CORRECTION

PATENT NO. : 9,223,623 B2
APPLICATION NO. : 13/433177
DATED : December 29, 2015
INVENTOR(S) : Nilesh R. Gujarathi et al.

It is certified that error appears in the above-identified patent and that said Letters Patent is hereby corrected as shown below:

On the title page, in item (74), in column 2, in "Attorney, Agent, or Firm", line 1, delete "Bellerman" and insert -- Bellermann --, therefor.

In the claims

In column 16, line 14, in claim 6, before "on" insert -- being executed --.

In column 16, line 36, in claim 6, before "processing" delete "at least one of the".

In column 16, line 62, in claim 10, delete "increase," and insert -- increase --, therefor.

Signed and Sealed this
Twenty-eighth Day of June, 2016

Michelle K. Lee
*Director of the United States Patent and Trademark Office*